United States Patent [19]

Anthon et al.

[11] Patent Number: 5,031,182
[45] Date of Patent: Jul. 9, 1991

[54] SINGLE-FREQUENCY LASER OF IMPROVED AMPLITUDE STABILITY

[75] Inventors: Douglas W. Anthon, Wheaton; Pedram Akhavan-Leilabady, Woodridge, both of Ill.

[73] Assignee: Amoco Corporation, Chicago, Ill.

[21] Appl. No.: 415,641

[22] Filed: Oct. 2, 1989

Related U.S. Application Data

[63] Continuation-in-part of Ser. No. 353,870, May 18, 1989, Pat. No. 4,933,947, which is a continuation-in-part of Ser. No. 207,666, Jun. 16, 1988, Pat. No. 4,884,277, which is a continuation-in-part of Ser. No. 157,741, Feb. 18, 1988, abandoned.

[51] Int. Cl.$^5$ ................................................ H01S 3/13
[52] U.S. Cl. ......................................... 372/31; 372/22; 372/34; 372/69; 372/70; 372/71; 372/94
[58] Field of Search ..................... 372/31, 34, 22, 27, 372/69–71, 94, 22; 307/427

[56] References Cited

U.S. PATENT DOCUMENTS

| | | | |
|---|---|---|---|
| 3,735,280 | 5/1973 | Johnston, Jr. | 372/22 |
| 4,268,800 | 5/1981 | Johnston, Jr. et al. | 372/94 |
| 4,656,635 | 4/1987 | Baer et al. | 372/21 |
| 4,730,335 | 3/1988 | Clark et al. | 372/21 |
| 4,731,795 | 3/1988 | Clark et al. | 372/21 |
| 4,739,507 | 4/1988 | Byer et al. | 372/94 |
| 4,791,631 | 12/1988 | Baumert et al. | 372/22 |
| 4,809,291 | 2/1989 | Byer et al. | 372/21 |

*Primary Examiner*—Georgia Epps
*Attorney, Agent, or Firm*—Richard A. Kretchmer; William H. Magidson; Ralph C. Medhurst

[57] ABSTRACT

A solid-state laser of improved amplitude stability is obtained by substantially eliminating spatial hole burning in the lasant material and maintaining the optical cavity of the laser at a temperature which results in substantially noise-free generation of output radiation.

19 Claims, 2 Drawing Sheets

SINGLE-FREQUENCY LASER OF IMPROVED AMPLITUDE STABILITY

CROSS-REFERENCE TO RELATED APPLICATIONS

This application is a continuation-in-part of application Ser. No. 353,870, filed May 18, 1989, U.S. Pat. No. 4,933,947, which is a continuation-in-part of application Ser. No. 207,666, filed June 16, 1988 U.S. Pat. No. 4,884,277, in turn is a continuation-in-part of application Ser. No. 157,741, filed Feb. 18, 1988, now abandoned.

FIELD OF THE INVENTION

This invention relates to a method for optimizing the amplitude stability of a solid-state laser.

BACKGROUND OF THE INVENTION

A laser is a device which has the ability to produce monochromatic, coherent light through the stimulated emission of photons from atoms, molecules or ions of an active medium which have typically been excited from a ground state to a higher energy level by an input of energy. Such a device contains an optical cavity or resonator which is defined by highly reflecting surfaces which form a closed round trip path for light, and the active medium is contained within the optical cavity.

If a population inversion is created by excitation of the active medium, the spontaneous emission of a photon from an excited atom, molecule or ion undergoing transition to a lower energy state can stimulate the emission of photons of substantially identical energy from other excited atoms, molecules or ions. As a consequence, the initial photon creates a cascade of photons between the reflecting surfaces of the optical cavity which are of substantially identical energy and exactly in phase. A portion of this cascade of photons is then discharged out of the optical cavity, for example, by transmission through one or more of the reflecting surfaces of the cavity. These discharged photons constitute the laser output.

Excitation of the active medium of a laser can be accomplished by a variety of methods. However, the most common methods are optical-pumping, use of an electrical discharge, and the passage of an electric current through the p-n junction of a semiconductor laser.

Semiconductor lasers contain a p-n junction which forms a diode, and this junction functions as the active medium of the laser. Such devices, which are also referred to as laser diodes, are typically constructed from materials such as gallium arsenide and aluminum gallium arsenide alloys. The efficiency of such lasers in converting electrical power to output radiation is relatively high and, for example, can be in excess of 40 percent.

The use of flashlamps, light-emitting diodes (as used herein, this term includes superluminescent diodes and superluminescent diode arrays) and laser diodes (as used herein, this term includes laser diode arrays) to optically pump or excite a solid lasant material is wellknown. Lasant materials commonly used in such solid state lasers include crystalline or glassy host materials into which an active material, such as trivalent neodymium ions, is incorporated. Highly suitable solid lasant materials include substances wherein the active material is a stoichiometric component of the lasant material. Such stoichiometric materials include, for example, neodymium pentaphosphate and lithium neodymium tetraphosphate. Detailed summaries of conventional solid lasant materials are set forth in the *CRC Handbook of Laser Science and Technology*, Vol. I, M. J. Weber, Ed., CRC Press, Inc., Boca Raton, Florida, 1982, pp. 72–135 and by A. A. Kaminskii in *Laser Crystals*, Vol. 14 of the Springer Series in Optical Sciences, D. L. MacAdam, Ed., Springer-Verlag, New York, N.Y., 1981. Conventional host materials for neodymium ions include glass, yttrium aluminum garnet ($Y_3Al_5O_{12}$, referred to as YAG), $YAlO_3$ (referred to as YALO), $LiYF_4$ (referred to as YLF), and gadolinium scandium gallium garnet ($Gd_3Sc_2Ga_3O_{12}$, referred to as GSGG). By way of example, when neodymium-doped YAG is employed as the lasant material in an optically-pumped solid state laser, it can be pumped by absorption of light having a wavelength of about 808 nm and can emit light having a wavelength of 1064 nm.

U.S. Pat. No. 3,624,545 issued to Ross on Nov. 30, 1971, describes an optically-pumped solid state laser composed of a YAG rod which is side-pumped by at least one semiconductor laser diode. Similarly, U.S. Pat. No. 3,753,145 issued to Chesler on Aug. 14, 1973, discloses the use of one or more light-emitting semiconductor diodes to end-pump a neodymium-doped YAG rod. The use of an array of pulsed laser diodes to end-pump a solid lasant material such as neodymium-doped YAG is described in U.S. Pat. No. 3,982,201 issued to Rosenkrantz et al. on Sept. 21, 1976. Finally, D. L. Sipes, *Appl. Phys. Lett.*, Vol. 47, No. 2, 1985, pp. 74–75, has reported that the use of a tightly focused semiconductor laser diode array to end pump a neodymium-doped YAG results in a high efficiency conversion of pumping radiation having a wavelength of 810 nm to output radiation having a wavelength of 1064 nm.

Solid-state lasers which exhibit single longitudinal mode operation to yield a single-frequency output can be obtained by eliminating spatial hole burning in the lasant material. Spatial hole burning is a consequence of the electric field nodes that are associated with a linearly polarized standing wave. The population inversion in the lasant material at these nodes does not contribute to the standing wave and will preferentially contribute to other longitudinal modes. In gas lasers, spatial hole burning is substantially prevented by the thermal motion of the atoms and/or molecules of the gas. However, in solids the motion of atoms and/or molecules is small in comparison with the wavelength of the light produced by the laser, and spatial averaging cannot take place.

Spatial hole burning in a solid-state laser can be prevented by eliminating the accumulation of an unutilized population inversion in the lasant material at the nodes of a standing wave. As a consequence, alternative longitudinal modes are prevented from reaching threshold, and the laser can produce single-frequency output through single longitudinal mode operation. For example, spatial hole burning can be eliminated through the use of a unidirectional ring cavity, by generating circularly polarized light in the lasant material, with mechanical motion, or with electro-optic phase modulations.

The use of a unidirectional ring cavity to prevent spatial hole burning is summarized in W. Koechner, *Solid-State Laser Engineering* (Springer-Verlag, New York, Second Ed., 1988) at pp., 126–128 and 223, and in Siegman, *Lasers* (University Science Books, Mill Valley, Calif., 1986) at pp. 532–538. U.S. Pat. No. 4,749,842 issued to Kane et al. on June 7, 1988 describes a laser diode-pumped, monolithic, unidirectional, ring laser wherein the lasant material is in thermal contact with a heating element. This patent discloses that the output wavelength of a monolithic, solid-state, unidirectional, ring laser can be temperature tuned by means of a heating element.

The elimination of spatial hole burning by generating circularly polarized light in the lasant material is described by V. Evtuhov et al., *Appl. Optics*, Vol. 4, No. 1, pp. 142-143 (1965). In this approach, an axially uniform energy density is created in the lasant material by forcing the laser mode to be a circularly polarized standing wave. The standing-wave electric field vector of such a mode changes in direction but not in magnitude as a function of position in the lasant material. Accordingly, there are no electric field nodes to cause spatial hole burning. A laser of this type is commonly referred to as a "twisted-mode" device.

A twisted-mode, single-frequency, neodymium-doped YAG laser has been reported by D. A. Draegert, *IEEE J. Quantum Electronics*, Vol. QE-8, No. 2, Feb. 1972, pp. 235-239. The laser described in this report was optically-pumped with a tungsten-iodine lamp and contained within its optical cavity a neodymium-doped YAG rod positioned between two quarter-wave plates together with a Brewster's angle plate placed immediately in front of one of the two end mirrors of the cavity. The fast axes of the two quarter-wave plates were perpendicular to each other and oriented at a 45° angle to the direction of polarization determined by the Brewster's angle plate. In addition, it is stated that this twisted-mode technique should work well with small diode-pumped neodymium-doped YAG lasers. More recently, a twisted-mode, single-frequency, laser diode-pumped, neodymium-doped YAG laser has been described at pp. 38-40 of *Laser Focus World* (Apr. 1989).

It is known in the art that amplitude and frequency instabilities can be observed in the output of single-frequency solid-state lasers. For example, such instabilities are discussed by Danielmeyer, *IEEE J. Quantum Electronics*, Vol. QE-6, No. 2, Feb. 1970, pp. 101-104.

SUMMARY OF THE INVENTION

The present invention is directed to a method for improving the amplitude stability of a solid-state laser. A high degree of amplitude stability is desirable if the output radiation from such a laser is to be used in applications such as optical storage of data, spectroscopy, communications, sensor systems, projection displays, laser printing and laser film read/write systems.

A solid-state laser which typically emits output radiation of a single-frequency can be obtained by eliminating spatial hole burning in the lasant material. We have found that the amplitude fluctuations (noise) in the output radiation from such a device are a function of temperature and drop to very low values over certain well-defined temperature ranges or "temperature windows." Accordingly, we have discovered that substantially noise-free operation can be achieved by maintaining the temperature of the laser cavity at a value within such a temperature window.

One embodiment of the invention is a method for generating coherent optical radiation which comprises: (a) generating coherent optical radiation from solid lasant material within an optical cavity for said radiation; (b) substantially preventing spatial hole burning in the lasant material during the generation of said radiation with spatial hole burning suppression means; (c) withdrawing at least a portion of said radiation from the optical cavity as output; and (d) maintaining the temperature of the optical cavity within a range over which said output is substantially noise-free.

Another embodiment of the invention is an optically-pumped solid-state laser comprising: (a) a standing wave optical cavity; (b) optical pumping means for generating optical pumping radiation, wherein said optical pumping means comprises a laser diode; (c) solid lasant material which is disposed within said optical cavity, positioned to receive pumping radiation from said optical pumping means, and effective for generating coherent optical radiation upon receiving the pumping radiation; (d) means for substantially eliminating spatial hole burning in the lasant material during said generation of coherent optical radiation; and (e) temperature control means for maintaining the temperature of the optical cavity at a value which results in substantially noise-free generation of said coherent radiation.

An object of the invention is to provide a laser diode-pumped solid-state laser of improved amplitude stability.

Another object of the invention is to provide a laser diode-pumped, twisted-mode, solid-state laser of improved amplitude stability.

A further object of the invention is to provide a method for reducing the amplitude instabilities that are observed in the output of a solid-state laser.

A still further object of the invention is to provide a method for improving the amplitude stability of a laser diode-pumped, twisted-mode, solid-state laser.

DETAILED DESCRIPTION OF THE PREFERRED EMBODIMENTS

Figure 1:
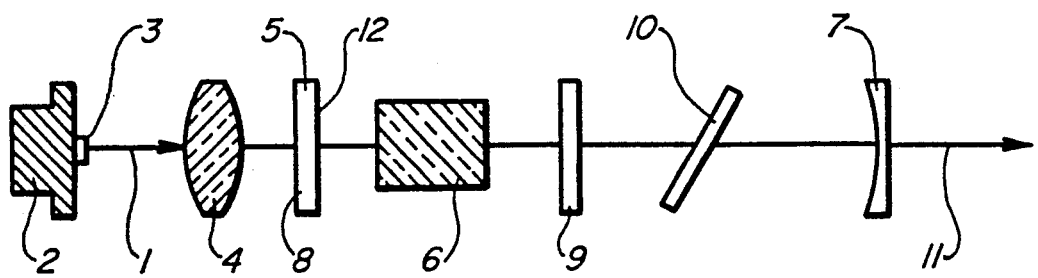
FIG. 1 of the drawings is a schematic illustration of one embodiment of the invention.
Figure 3:
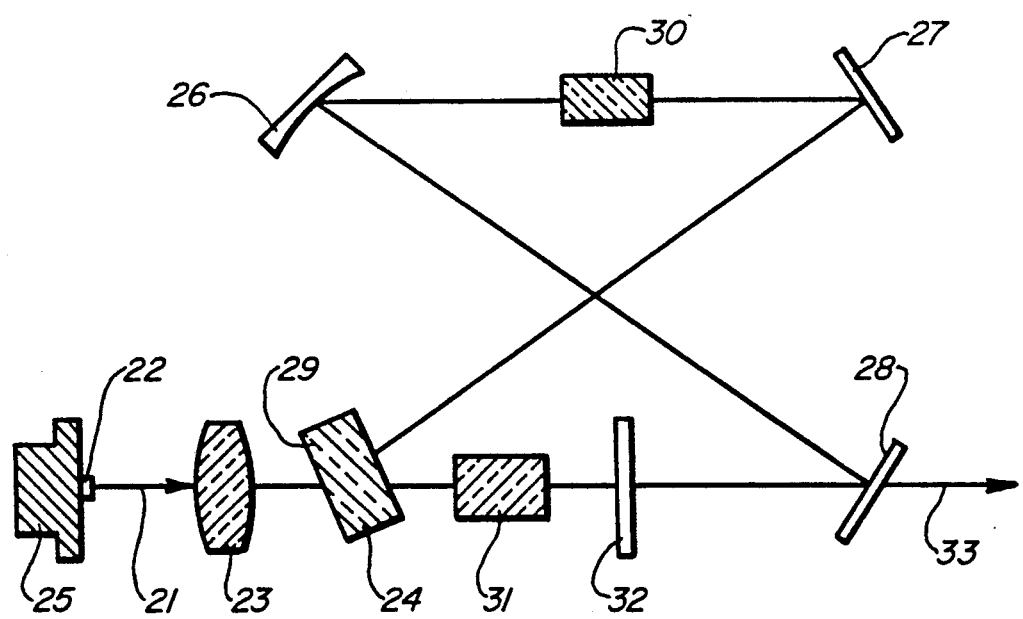
FIG. 3 of the drawings is a schematic illustration of a second embodiment of the invention.

While this invention is susceptible of embodiment in many forms, two specific embodiments are schematically shown in FIGS. 1 and 3 of the drawings, with the understanding that the present disclosure is not intended to limit the invention to the embodiments illustrated.

With reference to FIG. 1, optical pumping radiation 1 from optical pumping means 2 and 3 is focused by focusing means 4 through quarter-wave plate 5 and into solid lasant material 6 which is capable of being pumped by the radiation from said pumping means (2 and 3). Light emitted by the lasing of lasant material 6 oscillates within the linear standing wave optical cavity defined by mirror 7 and a suitable reflective coating on surface 8 of quarter-wave plate 5, and such light is hereinafter referred to as cavity radiation. A second quarter-wave plate 9 and a Brewster plate polarizer 10 are positioned between lasant material 6 and mirror 7. The pair of quarter-wave plates 5 and 9 serves to suppress spatial hole burning within lasant material 6, and the Brewster plate polarizer 10 causes the cavity radiation to be linearly polarized at mirror 7 and also determines the direction of polarization. A portion of the cavity radiation is passed through mirror 7 as output radiation 11. Finally, the laser illustrated in FIG. 1 is provided with temperature control means (which is not shown in the figure) for adjusting and controlling the temperature of the laser's optical cavity and its contents.

Optical pumping means 2 and 3 can comprise any conventional source of optical pumping radiation. However, preferred sources of pumping radiation 1 include light-emitting diodes and laser diodes. Such diodes are commonly attached to a thermally conductive heat sink and are packaged in a metal housing. For efficient operation, the pumping radiation 1 is matched with a suitable absorption band of the lasant material 6. Conventional light-emitting diodes and laser diodes are available which, as a function of composition, produce output radiation having a wavelength over the range from about 630 nm to about 1600 nm, and any such device producing pumping radiation 1 of a wavelength effective to pump lasant material 6 can be used in the practice of this invention. For example, the wavelength of the output radiation from a GaInP based device can be varied from about 630 to about 700 nm by variation of the device composition. Similarly, the wavelength of the output radiation from a GaAlAs based device can be varied from about 750 to about 900 nm by variation of the device composition, and InGaAsP based devices can be used to provide radiation in the wavelength range from about 1000 to about 1600 nm.

A highly suitable source of optical pumping radiation 1 consists of a gallium aluminum arsenide laser diode array 3, emitting light having a wavelength of about 810 nm, which is attached to heat sink 2. Heat sink 2 can be passive in character. However, heat sink 2 can also comprise a thermoelectric cooler to help maintain laser diode array 3 at a constant temperature and thereby ensure optimal operation of laser diode array 3 at a constant wavelength. It will be appreciated, of course, that during operation the optical pumping means will be attached to a suitable power supply. Electrical leads from laser diode array 3 which are directed to a power supply are not illustrated in FIG. 1.

Focusing means 4 serves to focus pumping radiation 1 through quarter-wave plate 5 and into lasant material 6. This focusing results in a high pumping intensity and an associated high photon to photon conversion efficiency in lasant material 6. Focusing means 4 can comprise any conventional means for focusing light such as a gradient index lens, a ball lens, an aspheric lens or a combination of lenses.

Any conventional solid lasant material 6 can be utilized provided that it is capable of being optically pumped by the optical pumping means selected. Suitable lasant materials include, but are not limited to, solids selected from the group consisting of glassy and crystalline host materials which are doped with an active material and substances wherein the active material is a stoichiometric component of the lasant material. Highly suitable active materials include, but are not limited to, ions of chromium, titanium and the rare earth metals. Highly suitable lasant materials include neodymium-doped YAG, neodymium-doped YALO, neodymium-doped YLF, neodymium-doped GSGG, neodymium pentaphosphate and lithium neodymium tetraphosphate. By way of specific example, neodymium-doped YAG is a highly suitable lasant material 6 for use in combination with an optical pumping means which produces light having a wavelength of about 810 nm. When pumped with light of this wavelength, neodymium-doped YAG can emit light having a wavelength of 1064 nm.

The precise geometric shape of lasant material 6 can vary widely. For example, lasant material 6 can be rod-shaped, or rhombohedral in shape if desired, and lens-shaped surfaces can be used if desired. If desired, an end-pumped fiber of lasant material can be used. Highly suitable fibers for this purpose include, but are not limited to, glass optical fibers which are doped with ions of a rare earth metal such as neodymium. The length of such a fiber is easily adjusted to result in absorption of essentially all of the optical pumping radiation 1. If a very long fiber is required, it can be coiled, on a spool for example, in order to minimize the overall length of the laser of this invention.

The reflective coating on surface 8 of quarter-wave plate 5 is selected in such a manner that it is substantially transparent to optical pumping radiation 1 but highly reflective with respect to the cavity radiation produced by the lasing of lasant material 6.

Mirror 7 is selected in such a manner that it is partially transmitting for the cavity radiation produced by the lasing of lasant material 6. Mirror 7 is conventional in character and, for example, can comprise any suitable conventional coating on any suitable substrate.

The pair of quarter-wave plates 5 and 9 are quarter-wave plates for cavity radiation and serve as a means for substantially eliminating spatial hole burning by causing circular polarization of the cavity radiation within lasant material 6 [this technique for producing an axially uniform energy density in a lasant material is described by V. Evtuhov et al., *Appl. Optics*, Vol. 4, No. 1, pp. 142-143 (1965)]. The precise location of these two quarter-wave plates within the optical cavity is not critical, provided that lasant material 6 is placed between them.

Brewster plate polarizer 10 results in the linear polarization of cavity radiation at mirror 7 and also determines the direction of polarization. This polarization permits convenient optimization of the orientation of quarter-wave plates 5 and 9 for elimination of spatial hole burning in lasant material 6. However, Brewster plate polarizer 10 is not an essential element of the invention and is not required to effect substantial elimination of spatial hole burning with quarter-wave plates 5 and 9.

A highly satisfactory orientation for quarter-wave plates 5 and 9 and for Brewster plate polarizer 10 involves positioning the quarter-wave plates so that the optic axis of one is substantially perpendicular with respect to the optic axis of the other about the axis along which they encounter cavity radiation and positioning Brewster plate polarizer 10 so that its highly transmitting axis is oriented at an angle of about 45° with respect to the optic axis of each quarter-wave plate.

Any conventional means for substantially eliminating spatial hole burning in the lasant material can be used in the practice of this invention. For example, spatial hole burning can be eliminated through the use of a traveling-wave ring-like optical cavity (which is illustrated by the embodiment set forth in FIG. 3), by generating circularly polarized light in the lasant material (which is illustrated in FIG. 1 and is effected by the pair of quarter-wave plates 5 and 9), with mechanical motion, or with electro-optic phase modulation.

The laser illustrated by FIG. 1 is provided with temperature control means for adjusting and controlling the temperature of the laser's optical cavity and its contents. This temperature control means can be of any conventional type, for example, an electrically powered resistance heater or thermoelectric device, and is used to maintain the temperature of the optical cavity at a value which results in substantially noise-free generation of output radiation 11. Through the use of such temperature control means, the temperature of the cavity and its contents is desirably maintained at ±1° C. of the selected value, preferably at ±0.5° C. of the selected value and more preferably at ±0.1° C. of the selected value.

The undesired fluctuations in the amplitude of output radiation 11, for example, within a frequency range of about 1 kHz to about 50 MHz, are referred to as noise and are conveniently measured as percent root mean square (% RMS) noise. Although a laser of improved amplitude stability is obtained through the substantial elimination of spatial hole burning in the lasant material 6, we have found that the noise content of output radiation 11 drops essentially to zero over certain temperature ranges. More specifically, if the noise content of output radiation 11 is measured as a function of the temperature of the laser cavity, certain ranges of temperature or "temperature windows" are observed over which the noise drops to essentially zero. The width of these windows and the precise temperatures at which they occur are different for each individual laser. That is to say, we have found that the noise content of output radiation 11 as a function of the temperature of the laser cavity is a unique characteristic of each device. However, for a given laser, the noise content of the output radiation 11 as a function of temperature does not change significantly over long periods of time (for example, weeks or months) or with repeated cycling over large temperature ranges. Accordingly, a highly preferred embodiment of this invention comprises locating a window of substantially noise-free operation for a laser by measuring the noise content of output radiation 11 as a function of the temperature of the optical cavity and maintaining the temperature of the laser cavity at a value within such a window during subsequent operation. These windows of substantially noise-free operation are typically from about 1° to about 15° C. wide, and within such a window the % RMS noise will typically be less than about 0.2% and frequently less than about 0.1%. The windows of substantially noise-free operation are easily identified by measuring the noise content of output radiation 11 over any range of temperature which is convenient from an operating point of view, for example, from about 0° to about 100° C., or more conveniently, from about 30° to about 65° C. This measurement is desirably carried out over a range of at least about 5° C. and preferably over a range of at least about 10° C. or 20° C. in order to give a reasonable sampling of the laser's temperature-related performance.

In a specific example of the embodiment illustrated in FIG. 1, neodymium-doped YAG is used as lasant material 6. The neodymium-doped YAG is optically pumped by a multistripe laser diode array 3 which is attached to a thermoelectric cooler 2 (the array and attached thermoelectric cooler is a Model SDL 2422-H1 device manufactured by Spectra Diode Labs of San Jose, Calif. The laser diode array 3 is a 10-stripe array consisting of 3 micron stripes on 10 micron centers which can provide about 200 mW of pumping radiation 1 having a wavelength of about 810 nm. This pumping radiation 1 is focused by gradient index lens 4 which has a 0.29 pitch and is antireflection coated with respect to 810 nm wavelength radiation. The focused pumping radiation passes through quarter-wave retardation plate 5 which is comprised of quartz and is in the form of a circular plate having a thickness of about 1 mm and a 10 mm diameter. Input face 8 of quarter-wave plate 5 carries a multilayer dielectric coating which is highly reflective (R>99.8%) at a wavelength of 1064 nm and highly transparent (T>80%) at a wavelength of 810 nm. Output face 12 of quarter-wave plate 5 carries an antireflection coating (R<0.2%) for light having a wavelength of 1064 nm and highly transparent (T>80%) at a wavelength of 810 nm. The focused pumping radiation comes to a focus within lasant material 6 which contains about 1% neodymium and is in the form of a disc having a 4 mm thickness and a 10 mm diameter. The lasant material 6 is oriented for low threshold operation at a wavelength of 1064 nm and emits light (cavity radiation) having a wavelength of 1064 nm in response to excitation by the pumping radiation. The surfaces of lasant material 6 are antireflection coated (R<0.2%) for light having a wavelength of 1064 nm and highly transparent (T>80%) at a wavelength of 810 nm. Quarter-wave plate 9 is identical with plate 5 except that both of its surfaces are antireflection coated with respect to 1064 nm wavelength radiation. Quarter-wave plates 5 and 9 are positioned in such a manner that the optic axis of one makes a 90° angle with respect to the optic axis of the other about the axis along which they encounter cavity radiation. The highly transmitting axis of Brewster plate polarizer 10 is oriented so that it makes an angle of 45° with respect to the optic axis of each of the quarter-wave plates 5 and 9 about the axis along which these components encounter cavity radiation. Output radiation 11 having a frequency of 1064 nm is transmitted through mirror 7 which has a radius of curvature of 30 cm and carries a dielectric coating which is 97% reflective at a wavelength of 1064 nm. The optical cavity of this laser has a length (distance from surface 8 to mirror 7) of about 20 mm. The optical cavity is wrapped with an electrically powered resistance heater and fitted with a thermistor which can be used to: (a) measure the cavity temperature; and (b) control the cavity temperature by providing a feedback signal to the power supply for the resistance heater.

Figure 2:
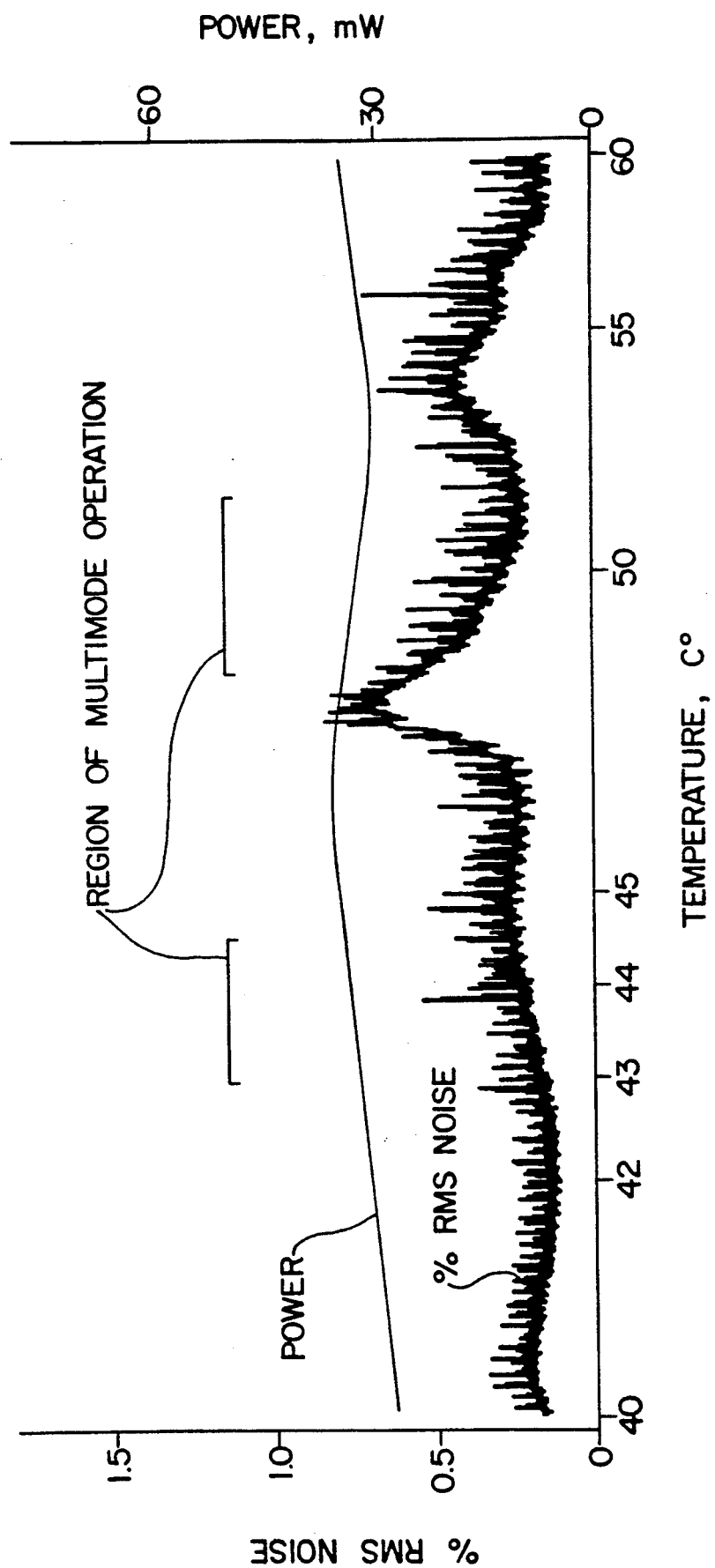
FIG. 2 of the drawings illustrates the optical output power of a laser diode-pumped solid-state laser of the type illustrated by FIG. 1 and the root mean square (RMS) noise content of said output as a function of the temperature of the laser cavity.

The power and percent root mean square (RMS) noise of the 1064 nm output radiation from the above-described laser were measured as a function of temperature over the range from about 40° to about 60° C. The results are set forth in FIG. 2. With reference to FIG. 2, it will be noted that the RMS noise in the output radiation drops to very low values over certain ranges of temperature or "temperature windows." For example, such a window for single frequency operation appears at about 40.0–43.0° C. The precise location and width of these windows of substantially noise-free operation are unique characteristics of each individual laser and do not change significantly with time (for example, weeks or months) or repeated temperature cycling over several tens of degrees centigrade. Accordingly, each laser can be made to operate in a substantially noise-free manner by maintaining the optical cavity of the device at a temperature within such a window during operation.

It will also be noted from FIG. 2 that the laser functions in a multilongitudinal mode manner (multimode operation) over certain temperature ranges. This is typical behavior for a solid-state laser in which spatial hole burning has been suppressed, and a preferred embodiment of the invention involves selecting a temperature window which yields: (a) substantially noise-free operation, and (b) single transverse mode operation.

FIG. 3 schematically illustrates a second embodiment of the invention which involves the use of a traveling-wave ring-like optical cavity for the purpose of substantially eliminating spatial hole burning in the lasant material. With reference to FIG. 3, optical pumping radiation 21 from laser diode array 22 is focused by focusing means 23 into lasant material 24 which is capable of being pumped by said pumping radiation. Laser diode array 22 is attached to heat sink 25. Light emitted by the lasing of lasant material 24 is contained within the optical cavity defined by mirrors 26, 27 and 28 and by a suitable reflective coating on surface 29 of lasant material 24, and such light is hereinafter referred to as cavity radiation. A unidirectional optical gate means for effecting unidirectional circulation of cavity radiation within the optical cavity is provided by the combination of polarizer 30, Faraday rotator 31, and half-wave plate 32. A portion of the cavity radiation is passed through mirror 28 as output radiation 33. Finally, the laser illustrated in FIG. 3 is provided with temperature control means (which is not shown in FIG. 3) for adjusting and controlling the temperature of the optical cavity and its contents. This temperature control means is employed to maintain the optical cavity of the laser at a value which results in substantially noise-free generation of output radiation 33.

The reflective coating on surface 29 of lasant material 24 is selected in such a manner that it is substantially transparent to optical pumping radiation 21 but highly reflective with respect to the cavity radiation produced by the lasing of lasant material 24. Mirrors 26 and 27 are highly reflective for the cavity radiation produced by the lasing of lasant material 24. Mirror 28 is partially transmitting for cavity radiation.

Any conventional polarization means can be utilized as polarizer 30, for example, a Brewster plate, suitable coatings on the mirrors of the optical cavity, a dielectric polarizer, or a Brewster angle surface on the lasant material 24.

If neodymium-doped YAG is used as the lasant material 24, the YAG crystal itself can also serve as Faraday rotator 31 if a magnetic field is established along the axis of the crystal. In such an embodiment, a separate Faraday rotator 31 is not required.

Conventional designs for a traveling-wave optical cavity which can be employed in the practice of this invention for the purpose of substantially eliminating spatial hole burning in the lasant material are set forth in W. Koechner, *Solid-State Laser Engineering* (Springer-Verlag, New York, Second Ed., 1988) at pp. 126–128 and in Siegman, *Lasers* (University Science Books, Mill Valley, Calif. 1986) at pp. 532–538.

We claim:

1. A method for generating coherent optical radiation which comprises:
   (a) generating coherent optical radiation from solid lasant material within an optical cavity for said radiation;
   (b) substantially preventing spatial hole burning in the lasant material during the generation of said radiation with spatial hole burning suppression means;
   (c) withdrawing at least a portion of said radiation from the optical cavity as output;
   (d) measuring the noise in said output as a function of the temperature of the optical cavity;
   (e) determining a first temperature range for the optical cavity over which said output is substantially noise-free; and
   (f) maintaining the temperature of the optical cavity at a value which is within said first temperature range during subsequent production of said output.

2. The method of claim 1 which additionally comprises:
   (a) measuring the longitudinal mode characteristics of said output as a function of the temperature of the optical cavity;
   (b) determining a second temperature range for the optical cavity over which said output is single-frequency and wherein said second temperature range overlaps said first temperature range; and
   (c) maintaining the temperature of the optical cavity at a value which is within said first and second temperature ranges during subsequent production of said output.

3. The method of claim 1 wherein the optical cavity is a standing wave cavity for said radiation.

4. The method of claim 3 wherein the optical cavity is a linear standing wave cavity for said radiation.

5. The method of claim 3 wherein said spatial hole burning suppression means comprises a pair of quarter-wave plates for effecting circular polarization of said radiation in the lasant material.

6. The method of claim 5 wherein the optical cavity contains a Brewster plate polarizer.

7. The method of claim 6 wherein the optic axis of one quarter-wave plate is substantially perpendicular to that of the other quarter-wave plate, and the highly transmitting axis of said Brewster plate polarizer is oriented at an angle of about 45° with respect to the optic axis of each quarter-wave plate.

8. The method of claim 1 wherein said optical cavity is a ring-type cavity and said spatial hole burning suppression means comprises unidirectional optical gate means for effecting unidirectional circulation of said radiation within the optical cavity.

9. The method of claim 8 wherein said unidirectional optical gate means is comprised of a polarizer, a half-wave plate, and a Faraday rotator.

10. The method of claim 1 which additionally comprises optically-pumping said lasant material with optical pumping means wherein said optical pumping means comprises a laser diode.

11. The method of claim 10 wherein said optical pumping means comprises a laser diode array.

12. An optically-pumped solid-state laser comprising:
    (a) a standing wave optical cavity;
    (b) optical pumping means for generating optical pumping radiation, wherein said optical pumping means comprises a laser diode;
    (c) solid lasant material which is disposed within said optical cavity, positioned to receive pumping radiation from said optical pumping means, and effective for generating coherent optical radiation upon receiving the pumping radiation;
    (d) means for substantially eliminating spatial hole burning in the lasant material during said generation of coherent optical radiation; and
    (e) temperature control means for maintaining the temperature of the optical cavity within a temperature range which results in substantially noise-free generation of said coherent radiation wherein said temperature range is determined by evaluating the noise in said coherent radiation as a function of the temperature of said optical cavity.

13. The laser of claim 12 wherein the optical cavity is a linear standing wave cavity.

14. The laser of claim 12 wherein said temperature control means is effective to maintain said optical cavity at a substantially constant temperature.

15. The laser of claim 12 wherein said optical pumping means comprises a laser diode array.

16. The laser of claim 12 wherein said lasant material is comprised of neodymium-doped YAG.

17. The laser of claim 12 wherein said means for substantially eliminating spatial hole burning comprises a pair of quarter-wave plates within the optical cavity, and said lasant material is positioned between the quarter-wave plates.

18. The laser of claim 17 wherein the optical cavity contains a Brewster plate polarizer.

19. The laser of claim 18 wherein the optic axis of one quarter-wave plate is substantially perpendicular to that of the other quarter-wave plate, and the highly transmitting axis of said Brewster plate polarizer is oriented at an angle of about 45° with respect to the optic axis of each quarter-wave plate.

* * * * *

UNITED STATES PATENT AND TRADEMARK OFFICE
CERTIFICATE OF CORRECTION

PATENT NO. : 5,031,182
DATED : July 9, 1991
INVENTOR(S) : Douglas W. Anthon and Pedram Akhavan-Leilabady It is certified that error appears in the above-identified patent and that said Letters Patent is hereby corrected as shown below:

Column 1, line 10, "1988 U.S." should read --1988, U.S.--.

Column 1, line 60, "wellknown" should read --well-known--.

Column 7, line 62, "Calif." should read --California).--.

Column 10, lines 25 and 26, "quarter-wave. plates" should read --quarter-wave plates--.

Signed and Sealed this

Twenty-fifth Day of May, 1993

MICHAEL K. KIRK

Attest:

Attesting Officer

Acting Commissioner of Patents and Trademarks